United States Patent [19]
Horiuchi

[11] Patent Number: 5,302,091
[45] Date of Patent: Apr. 12, 1994

[54] MAGNETICALLY DRIVEN CENTRIFUGAL PUMP

[75] Inventor: Korejiro Horiuchi, Kobe, Japan

[73] Assignee: Sanwa Hydrotech Corp., Hyogo, Japan

[21] Appl. No.: 10,531

[22] Filed: Jan. 28, 1993

[30] Foreign Application Priority Data

Mar. 24, 1992 [JP] Japan .................. 4-015360[U]

[51] Int. Cl.⁵ ............................................. F04B 35/04
[52] U.S. Cl. ............................ 417/420; 417/423.12; 415/111; 415/229
[58] Field of Search ............. 417/423.12, 366, 420; 415/111, 229

[56] References Cited

U.S. PATENT DOCUMENTS

| | | | |
|---|---|---|---|
| 3,420,184 | 1/1969 | Englesberg et al. | 417/420 |
| 3,713,749 | 1/1973 | Fitch | 415/229 |
| 3,796,507 | 3/1974 | Smykal et al. | 415/111 |
| 3,877,844 | 4/1975 | Klaus et al. | 417/420 |
| 4,421,456 | 12/1983 | Huffman | 415/229 |
| 4,834,628 | 5/1989 | Laing | 417/420 |
| 5,059,097 | 10/1991 | Okazaki et al. | 417/222.1 |
| 5,160,246 | 11/1992 | Horiuchi | 415/229 |
| 5,195,867 | 3/1993 | Stirling | 415/111 |

Primary Examiner—Richard A. Bertsch
Assistant Examiner—Peter Korytnyk
Attorney, Agent, or Firm—Koda and Androlia

[57] ABSTRACT

In a magnetically driven centrifugal pump so designed that a drive power of an electric motor is transmitted from a magnets-embedded drive rotor to a magnets-embedded follower rotor which is opposed to the drive rotor for the formation of a magnetic coupling and is associated with an impeller by a rotating shaft, the rotating shaft is supported with a radial bearing of ceramic material of non-rotation which is fitted into a supporting member fixed in a pump casing, wherein a cushioning member is mounted compressedly in an interspace between a front end of the thrust bearing and a circular edged projection of the supporting member which are opposed to one another.

5 Claims, 3 Drawing Sheets

MAGNETICALLY DRIVEN CENTRIFUGAL PUMP

BACKGROUND AND SUMMARY OF THE INVENTION

The present invention relates to a magnetically driven centrifugal pump, particularly of a single suction structure, in which an impeller is rotated by way of a magnetic coupling between a magnets-embedded follower rotor interconnected with the impeller and a magnets-embedded drive rotor interconnected with an electric motor.

In the conventional centrifugal pump of a single suction structure of the above-mentioned type, the impeller is fixed to the outward end portion of the rotating shaft which is rotatably supported in the center line of a pump casing by way of a supporting member attached internally to the casing. Furthermore, a radial bearing of ceramic material resistant to hard wear is interposed between the rotating shaft and the supporting member so as to withstand a high speed of rotation of the rotating shaft.

In the operation of the above-described centrifugal pump, the magnets-embedded drive rotor is rotated directly by an electric motor, and the magnets-embedded follower rotor opposed inside to the drive rotor is rotated accordingly by indirect way of a magnetic coupling, so that the rotating shaft and the impeller are caused to rotate integrally with the follower rotor. With the rotation of the rotating shaft and the impeller, the impeller imparts centrifugal force to the liquid coming into a suction port which is configured in the axial center of the impeller, thus carrying the liquid radially in an accelerated manner.

However, when the impeller pressurizes and discharges the liquid, the impeller adversely receives an uneven reaction of axial load (i.e., thrust) and radial load, and hence the rotating shaft especially at high speedy rotation is subjected to unbalanced vibration. Accordingly, the ceramic radial bearing and a ceramic thrust bearing, which can withstand hard wear but is relatively low in toughness against breakage, i.e. in brittleness, are likely to suffer damage or breakage due to the influence of axial load and impact occurring with the vibration of the rotating shaft at high speedy rotation.

To solve the above-described problem of the prior art, the inventor of the present application has previously proposed an improvement in the magnetically driven centrifugal pump, as disclosed in U.S. Pat. No. 5,160,246, where a cushioning member is mounted on the impeller rotating shaft in the position between a rotational side thrust bearing of ceramic put adjacent to a non-rotational side ceramic radial bearing and a flange provided integrally on the middle of the rotating shaft so as to positively push the thrust bearing continuously outwards from the rear against the radial bearing, directly. In this arrangement, the vibration of the rotating shaft at high speedy rotation is absorbed and lessened by the cushioning member.

According to the above-described arrangement of the improved pump, the cushioning member is arranged to rotate integrally with the impeller rotating shaft and the rotational side ceramic thrust bearing, so that the cushioning member's absorption of vibration of the rotating shaft at a high speedy rotation is limited relatively to a certain degree. Furthermore, since the ceramic thrust bearing displaces in an axial or radial direction or a vectorial direction at a high speedy rotation of the rotating shaft, a chattering phenomenon takes place to the cushioning member, and further spreads multiply to the rotational side thrust bearing and the non-rotational radial bearing to thereby result in the damage or breakage of their bearings, especially of the thrust bearing.

It is accordingly a primary object of the present invention to provide a magnetically driven centrifugal pump, in which there is no fear of damage and breakage of the ceramic bearings, so designed as to relieve the influence of thrust load and vibration of the impeller rotating shaft at high speedy rotation upon the ceramic bearing by absorbing such thrust load and vibration.

It is a secondary object of the present invention to provide a magnetically driven centrifugal pump so designed as to give a preferable cushioning effect to the ceramic bearings without a likelihood that a chattering phenomenon occurs in a cushioning member arranged for absurbing the vibration of the impeller rotating shaft at a high speedy rotation.

It is a further object of the present invention to provide a magnetically driven centrifugal pump so designed as to prevent the likely vibration of the rotation shaft at high speedy rotation by the operation of a so-called self-aligning.

It is a further object of the present invention to provide a magnetically driven centrifugal pump so designed as to save the likely wear and fatigue on the ceramic radial bearing due to contact with the rotation shaft by cooling the frictional heat which generates between the radial bearing and the rotating shaft.

With the above and other objects in view, the present invention provide a magnetically driven centrifugal pump so designed that a drive power of an electric motor is transmitted from a magnets-embedded drive rotor to a magnets-embedded follower rotor opposed to one another for formation of a magnetic coupling; comprising a pump casing separated internally by a partition into two rooms of which one accommodates the drive rotor and the other accommodates the follower rotor, a rotating shaft holding the follower rotor on an inward portion thereof while holding an impeller on an outward end portion, the rotating shaft being supported with a radial bearing of ceramic material of non-rotation which is fitted into a supporting member fixed in the pump casing, a thrust bearing of ceramic material being secured to the rotating shaft for integral rotation and juxtaposed in a condition of contact with said radial bearing of non-rotation so as to receive an axial load of the rotating shaft, and a cushioning member being mounted compressedly in an interspace between a front end of the thrust bearing and a circular edged projection of the supporting member which are opposed to one another.

Preferably, the radial bearing has an exterior surface curved outwards like the bilge of a barrel, while an interior surface of the radial bearing is provided with a spiral groove.

BRIEF DESCRIPTION OF THE DRAWING

The present invention will now be described by way of example with reference to the accompanying drawings in which.

DETAILED DESCRIPTION OF THE PREFERRED EMBODIMENTS

Figure 1:
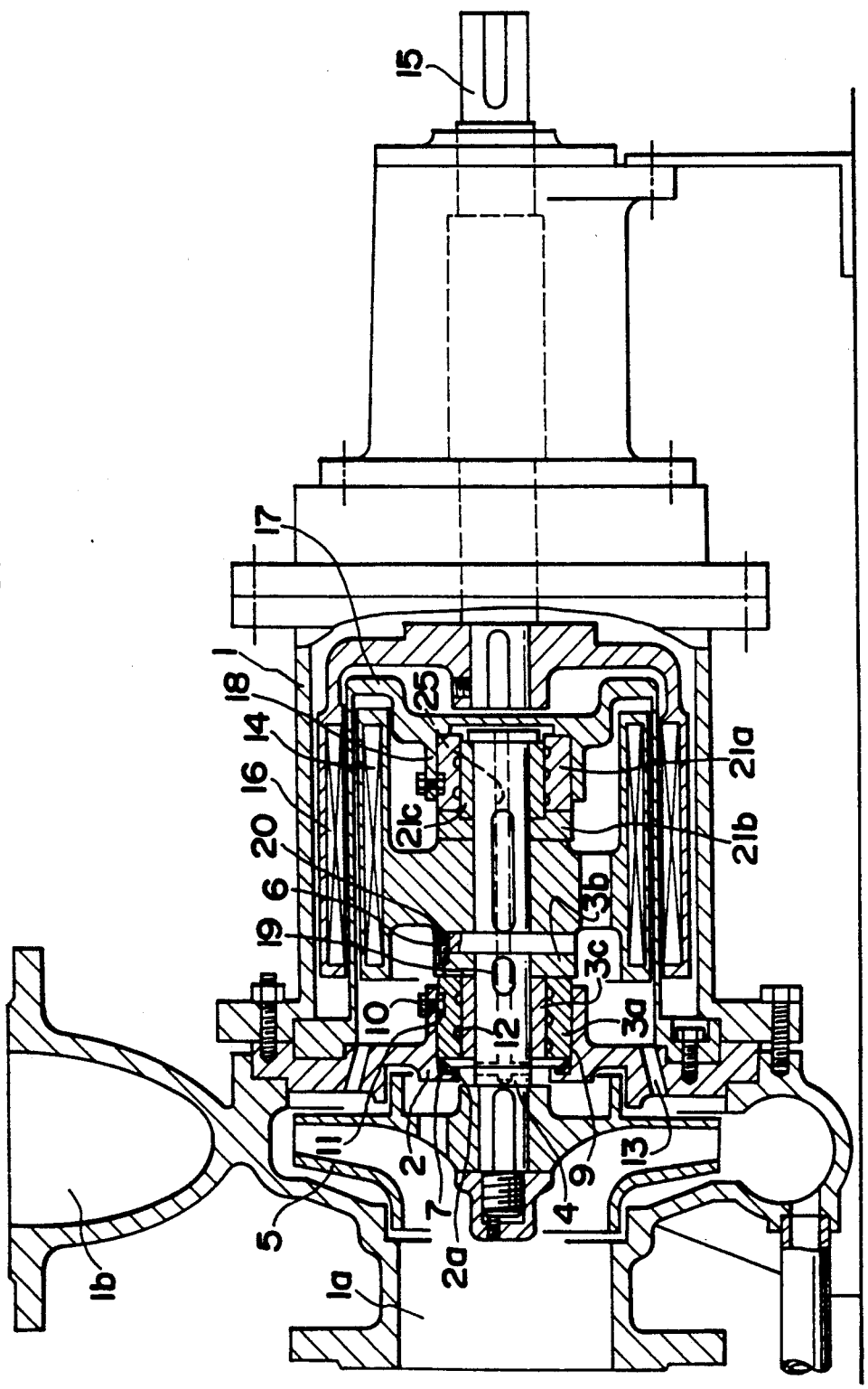
FIG. 1 is a longitudinal sectional view of a magnetically driven centrifugal pump embodying the present invention.

Referring to FIG. 1 the reference numeral 1 designates a casing of a magnetically driven centrifugal pump, which is divided internally into two major rooms by a recessed fluidtight partition 17, shaped nearly like a beaker, of nonmagnetic material for isolating the inside of the pump from a motor. In the room located on the side of an electric driving motor (not shown), a drive rotor 16 with pieces magnet embedded therein is connected to a driving shaft 15 to be associated with of the motor, in such an arrangement as to surround the partition 17. In the other room adjacent to a fluid intake 1a, a rotating shaft 4 is rotatably supported in the center on the same axis as the driving shaft 15, wherein the inmost end portion of the rotating shaft 4 is maintained in a boss 18 formed on the internal bottom of the partition 17 while the middle portion of the rotating shaft 4 is maintained by a supporting member 2 which has an external periphery attached fast to the casing 1 and subdivides the latter room. On the intermediate portion situated between the inmost end portion and the middle portion of the rotating shaft 4, there is mounted a follower roller 14 with pieces of magnet embedded therein in opposition to the aforesaid drive roller 16, wherein the cylindrical part of the partition 17 is located between both the rotors 14, 16. The follower rotor 14 is caused to rotate with the rotation of the drive rotor, due to a magnetic coupling. An impeller 5 is mounted on the outermost end portion of the rotating shaft 4 so that the fluid entering an intake 1a of the pump can be forcibly carried with a high kinetic energy to an outlet 1b of the pump by the rotation of the impeller 5.

In the magnetically driven centrifugal pump so constructed as described above, a radial bearing 3a of ceramic material in the shape of a sleeve which can take a radial and axial load is fitted onto a center penetration hole of the supporting member 2 so as to withstand a high rotation of the rotating shaft 4. In the embodiment shown in the drawing, a supplementary bearing 3c of ceramic material in the shape of a sleeve is optionally provided in the inside of the sleeve-shaped radial bearing 3a in contact with each other, and is secured on the rotating shaft 4 with a key 19 so as to prevent the wear of the rotating shaft 4 to be supported by the radial bearing 3a. That is, the rotating shaft 4 on the rotational side is maintained by the supporting member 2 on the stationary side while the supplementary bearing 3c provided integrally on the former member 4 is supported rotatably on the radial bearing 3a provided on the latter member 2 on the stationary side.

Figure 2:
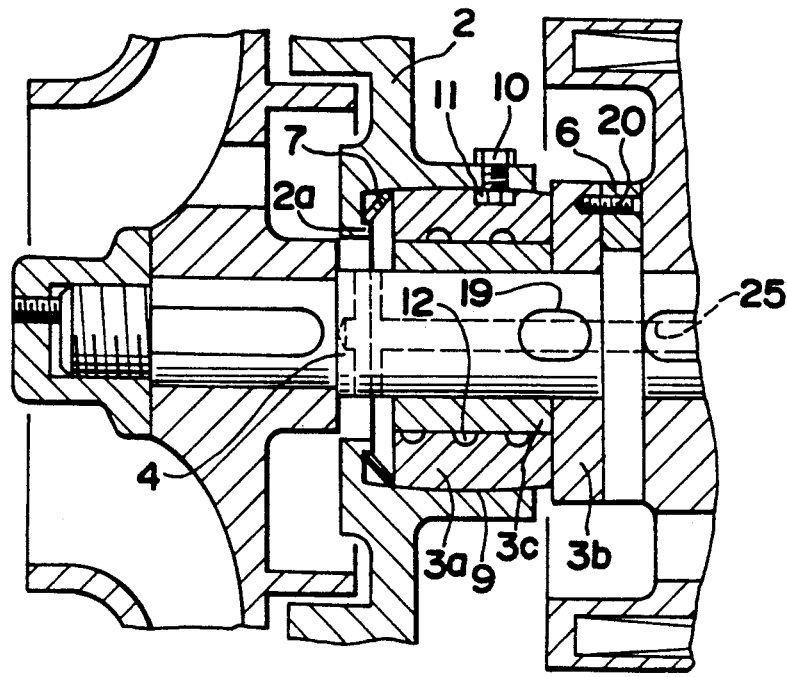
FIG. 2 is an enlarged view of FIG. 1, showing the characteristic parts of the same pump.
Figure 3:
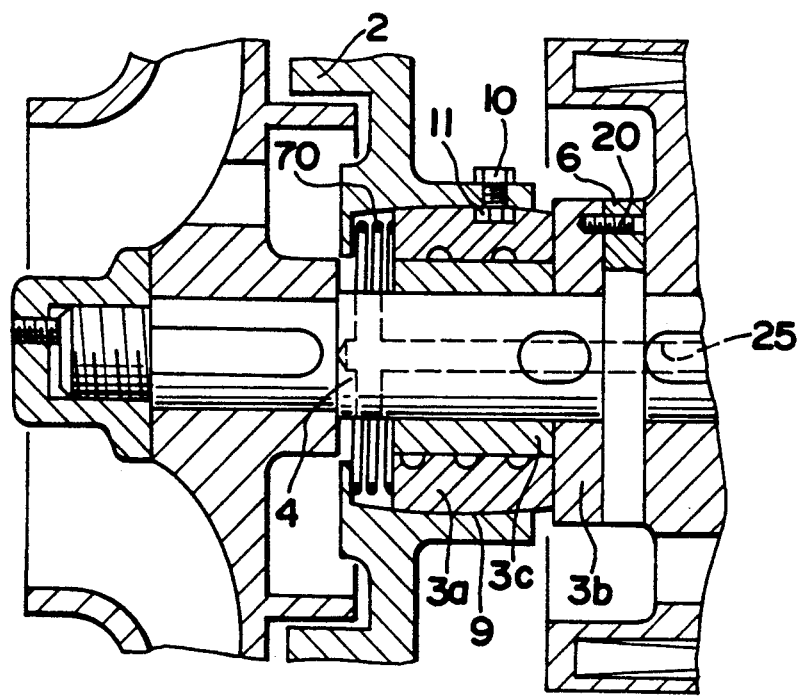
FIG. 3 to 5 are views, similar to FIG. 2, of other modifications of the cushioning member.
Figure 4:
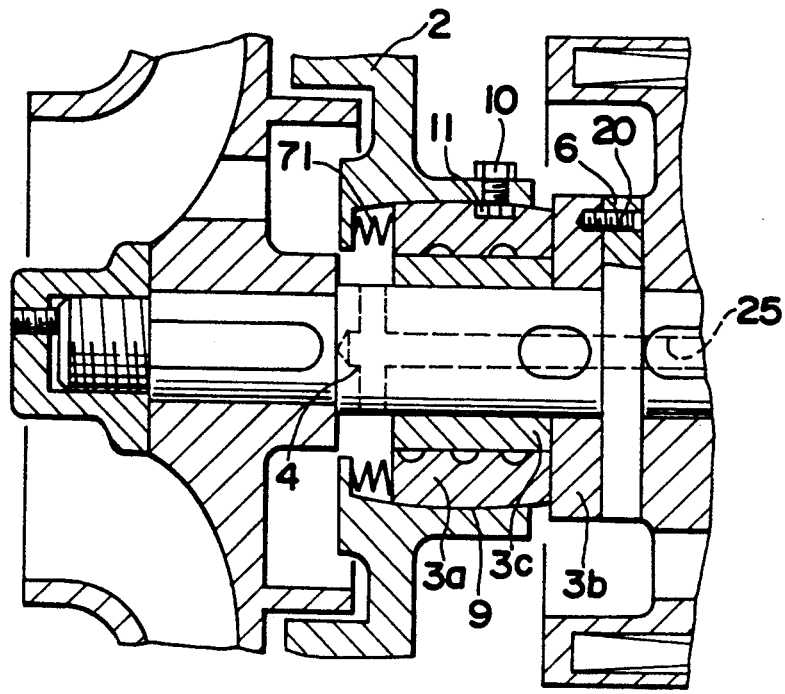

The ceramic radial bearing 3a has an exterior surface 9 curved outwards like the bilge of a barrel, as shown particularly in FIGS. 2 to 4, thus being moderately swingable in relation to the supporting member 2. That is, the radial bearing 3a functions as self-aligning-mechanism to absorb the axial shake of the rotating shaft. A screw bolt 10 is one that restricts the rotational and axial movement of the ceramic radial bearing 3a by putting the free end of the bolt 10 idly into a longitudinal depression 11 formed on the exterior surface 9 of the radial bearing 3a. In this manner, the radial bearing 3a is set on the stationary side support member 2 while the radial bearing 3a is allowed to move a little in an axial direction, but not allowed to rotate.

A thrust bearing 3b of ceramic material in the form of a collar which can take an axial load, is secured on the rotating shaft 4 with the key 19 in such a manner as to be in contact with the rear end faces of the above-described radial and supplementary bearings 3a, 3c, so that the thrust bearing 3b can be rotated integrally with the rotating shaft 4. In addition, the thrust bearing 3b is secured with a set screw 20 onto a flange 6 which is provided integrally with the rotating shaft 14. The thrust bearing 3b takes the thrust charge of the rotating shaft 4 in cooperation with the radial and supplementary bearing 3a, 3c.

A cushioning member 7 is mounted compressedly in a front side clearance between the front end face of the radial bearing 3a and the opposed circular edged project 2a of the supporting member 2, in a condition to encircle the rotating shaft 4.

Figure 5:
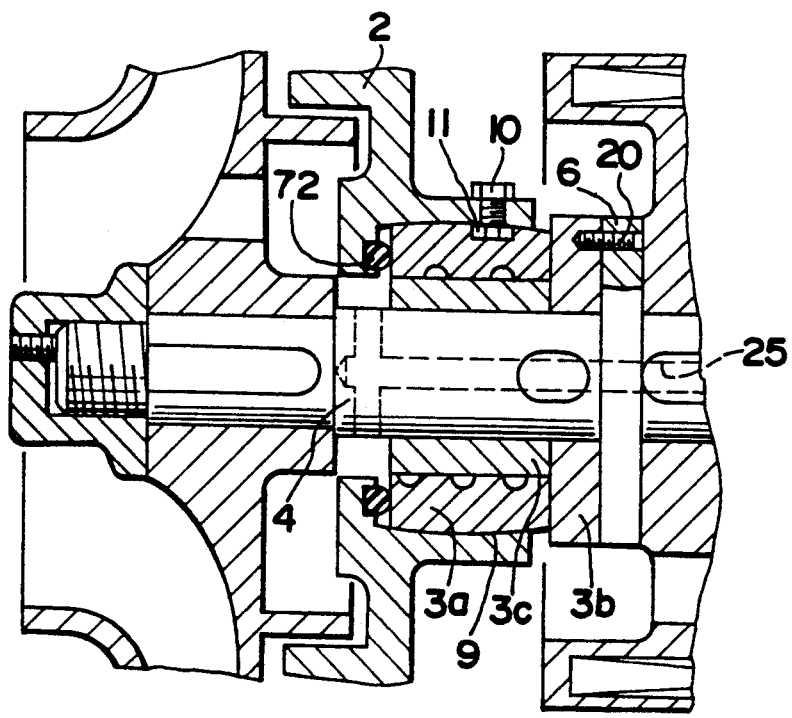

The above-mentioned cushioning member 7 is any one in the form of a cushioning spring, a cushioning rubber, a cushioning extrusion of elastic plastics, and the like. For the cushioning spring, it is possible to specify a dish-shaped plate spring 7 of metal or hard plastics as shown FIG. 2, a coiled spring 70 as shown in FIG. 3, and a bellows spring 71 as shown FIG. 4. For the cushioning rubber and the cushioning extrusion of elastic plastics, it is possible to specify a component 72 shaped like a O-ring, as shown in FIG. 5, and a component shaped like a hollow cylinder recessed, swelled or even in the middle surface. All of the cushioning spring, the cushioning rubber, and the cushioning extrusion of elastic plastics are arranged to encircle the rotating shaft 4. In the case where a liquid used in the pump is of corrosiveness, the cushioning spring, the cushioning rubber, and the cushioning extrusion of elastic plastics may be preferably made up of corrosion resistant material.

The cushioning member 7, which is mounted compressedly, as mentioned above, between the front end face of the ceramic radial bearing 3a and the opposed part of the supporting member 2, presses the ceramic radial bearing 3a against the rotational side ceramic thrust bearing by an elastic operation so as to keep these two bearings 3a, 3b under a condition of mutual contact. Therefore, the impact occurring with the uneven vibration of the rotating shaft 4 at high speedy rotation is absorbed by the cushioning member 7 so as to hardly travel over both the ceramic bearings 3a, 3b, especially over the ceramic thrust bearing 3b which receives a thrust load of the rotating shaft 4. Thus, the steady drive of the rotating shaft 4 and the impeller 5 is guaranteed.

The present invention is characterized in that the cushioning member 7 is mounted in a front side clearance between two non-rotating side members of the supporting member 7 and the ceramic radial bearing 3a fitted thereon, whereby the present invention can bring a peculiar effect not found in the above-described prior art.

That is, with the arrangement of the prior art to mount a cushioning member in a rear side clearance between two rotation sides, i.e. the ceramic thrust bearing rotatable integrally with the rotating shaft and the flange provided integrally on the middle of the rotating shaft, it is possible to absorb moderately the uneven vibration of the thrust bearing due to the vibration of the rotating shaft; but there is a likelihood that a chattering phenomenon will take place to the cushioning member under a direct influence of the uneven vibration of the thrust bearing. Also, the multiple uneven vibration accompanied therewith occurs in and gives damage to both the ceramic bearings.

In contrast to the prior art, with the above-described arrangement of the present invention to mount a cushioning member 7 in a front side clearance between two non-rotational side members, it is possible to prevent the uneven vibration of the rotating shaft 4 from giving a direct influence on the ceramic thrust bearing 3b and thereby give a preferable cushioning effect to both the ceramic bearings 3a. 3b.

Besides, the ceramic radial bearing 3a on the non-rotational side has an interior surface provided with a spiral groove 12. While the liquid flowing through the intake 1a into the pump is discharged from the outlet 1b by the rotation of the impeller 5, a part of the liquid is caused to make one's way between both the bearing 3a on the non-rotational side and the other bearings 3b, 3c on the rotational side through side holes 13 provided in the supporting member 2. The penetrated liquid is guided by the spiral groove of the radial bearing 3a, and is then caused to flow back into the inside room of the impeller 5 by the attraction of the rotating impeller 5. Accordingly, frictional heat, which tends to generate between the radial bearing 3a on the non-rotational side and the thrust and supplementary bearings 3b, 3c on the rotational side, is caused to cool, so that it is possible to prevent the likely wear and fatigue on the bearings 3a, 3b, 3c.

Incidentally, in the boss 18 where the inmost end portion of the rotating shaft 4 is maintained, there are provided a ceramic radial bearing 21a, a ceramic thrust bearing 21b and a ceramic supplementary bearing 21c for a smooth rotation of the rotating shaft 4, similarly to the provision of the ceramic bearings 3a, 3b, 3c in the supporting member 2 and the opposed portion of the rotating shaft 4.

It should be understood, of course, that the specific forms of the invention herein illustrated and described are intended to be representative only, as certain changes may be made therein without departing from the clear teachings of the disclosure. Accordingly, reference should be made to the following appended claims determining the full scope of the invention.

We claim:

1. A magnetically driven centrifugal pump so designed that a drive power of an electric motor is transmitted from a magnets-embedded drive rotor to a magnets-embedded follower rotor opposed to one another for formation of a magnetic coupling; comprising a pump casing separated internally by a partition into two rooms of which one accommodates the drive rotor and the other accommodates the follower rotor, a rotating shaft holding the follower rotor on an inward portion thereof while holding an impeller on an outward end portion, the rotating shaft being supported with a sleeve-shaped radial bearing of ceramic material of non-rotation which is fitted into a supporting member fixed in the pump casing, a sleeve-shaped supplementary bearing of ceramic material set inside said sleeve-shaped radial bearing in mutual contact and secured on the rotating shaft, a thrust bearing of ceramic material being secured to the rotation shaft for integral rotation and juxtaposed in a condition of direct contact with rear ends of said radial bearing of non-rotation and said supplementary bearing so as to receive an axial load of the rotating shaft, said radial bearing of non-rotation being adapted to move only in an axial direction, and a cushioning member being mounted compressedly in an interspace between a front end of the radial bearing and a circular edged projection of the supporting member which are opposed to one another.

2. A magnetically driven centrifugal pump as defined in claim 1, wherein the cushioning member is selected from the group consisting of a cushioning spring, a cushioning rubber and a cushioning extrusion of elastic plastics, which are formed to encircle the rotating shaft.

3. A magnetically driven centrifugal pump as defined in claim 1, wherein the radial bearing of ceramic material has an exterior surface curved outwards so as to be swingable in relation to the supporting member.

4. A magnetically driven centrifugal pump as defined in claim 1, wherein the radial bearing has an interior surface provided with a spiral groove, which communicates with an intake of the pump.

5. A magnetically driven centrifugal pump as defined in claim 1, wherein said radial bearing has a relative short length of longitudinal depression formed on an exterior surface thereof, and a screw bolt is screwed through the support member into said depression of the radial bearing, whereby the radial bearing can move only in an axial direction.

* * * * *